US012775585B1

(12) United States Patent
Meng et al.

(10) Patent No.: US 12,775,585 B1
(45) Date of Patent: Oct. 27, 2026

(54) EFFICIENT RECOMPRESSION OF COMPRESSED DATA

(71) Applicant: Amazon Technologies, Inc., Seattle, WA (US)

(72) Inventors: Qingxi Meng, Cupertino, CA (US); Shubham Chandak, Mountain View, CA (US); Dmitri Pavlichin, Redwood City, CA (US); Itschak Weissman, Stanford, CA (US); Christopher George Burgess, Charlotte, NC (US); Andrew Kent Warfield, Vancouver (CA); Aaron Joseph Smith, Durham, NC (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/542,081

(22) Filed: Dec. 15, 2023

(51) Int. Cl.
*G06F 16/174* (2019.01)

(52) U.S. Cl.
CPC ................................ *G06F 16/1744* (2019.01)

(58) Field of Classification Search
CPC ............................. G06F 16/1744; H03M 7/30
See application file for complete search history.

(56) References Cited

U.S. PATENT DOCUMENTS

| | | | | |
|---|---|---|---|---|
| 7,502,514 | B2 | 3/2009 | Gringeler et al. | |
| 9,559,720 | B2 | 1/2017 | Marwah et al. | |
| 10,715,176 | B1 * | 7/2020 | Singh | G06F 17/18 |
| 2006/0104526 | A1 * | 5/2006 | Gringeler | H04N 19/60 375/E7.199 |
| 2020/0249877 | A1 * | 8/2020 | McIlroy | G06F 16/1744 |
| 2021/0034587 | A1 | 2/2021 | Arye et al. | |
| 2022/0358093 | A1 * | 11/2022 | Damojipurapu | G06F 21/565 |

* cited by examiner

*Primary Examiner* — Khanh B Pham
*Assistant Examiner* — Kweku William Halm
(74) *Attorney, Agent, or Firm* — S. Scott Foster; Kowert, Hood, Munyon, Rankin & Goetzel, P.C.

(57) ABSTRACT

Efficient recompression is performed for compressed data. A compressed data object original compressed using intermediate representations is obtained. The data object is partially decompressed to generate the intermediate portions of the data object. Then, the intermediate representations are recompressed using a different compression technique in order to generate a recompressed version of the data object.

20 Claims, 9 Drawing Sheets

EFFICIENT RECOMPRESSION OF COMPRESSED DATA

BACKGROUND

Modern computing applications require storage of large amounts of data. Over time, the need to store and retrieve large amounts of data continues to increase. Other common concerns are the ability to store data durably and efficiently. Durability typically refers to the ability to recover data in the event of a failure. Data durability typically requires some form of redundancy in how the data is stored. For example, data may be mirrored to two different storage devices such that an exact replica copy of the data is stored on both storage devices. If one of the storage devices fails, the data can still be retrieved from the other storage device. Some systems desire even stronger levels of durability that involve more complex redundancy encoding schemes that allow the data to still be retrieved even after multiple device failures. Techniques to provide data durability typically incur some amount of overhead, both in terms of the amount of additional storage required and computational overhead, and thus are at odds with the desire to be able to store and retrieve large amounts of data efficiently.

Web-based applications, cloud computing, and other network and Internet based technologies are area frequently requiring storage of large amounts of data with needs for durability and efficiency. The conventional Web model allows clients to access Web resources (e.g., applications, services and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as extensible Markup Language (XML), for example.

One example of a service that is provided to clients via a Web service interface is a data storage service. A typical data storage service (which may be referred to herein as an "object-redundant storage system") may receive requests to store data objects on behalf of storage service clients, and may store those data objects using redundancy in order to provide a high level of durability for the stored data. For example, such a data storage service may replicate the objects it stores across different storage nodes to increase the likelihood that object data will survive the failure of any given storage node. Typically, object-redundant storage systems may be also seek to improve performance characteristics, such as latency, throughput, availability, or storage efficiency.

Figure 1:
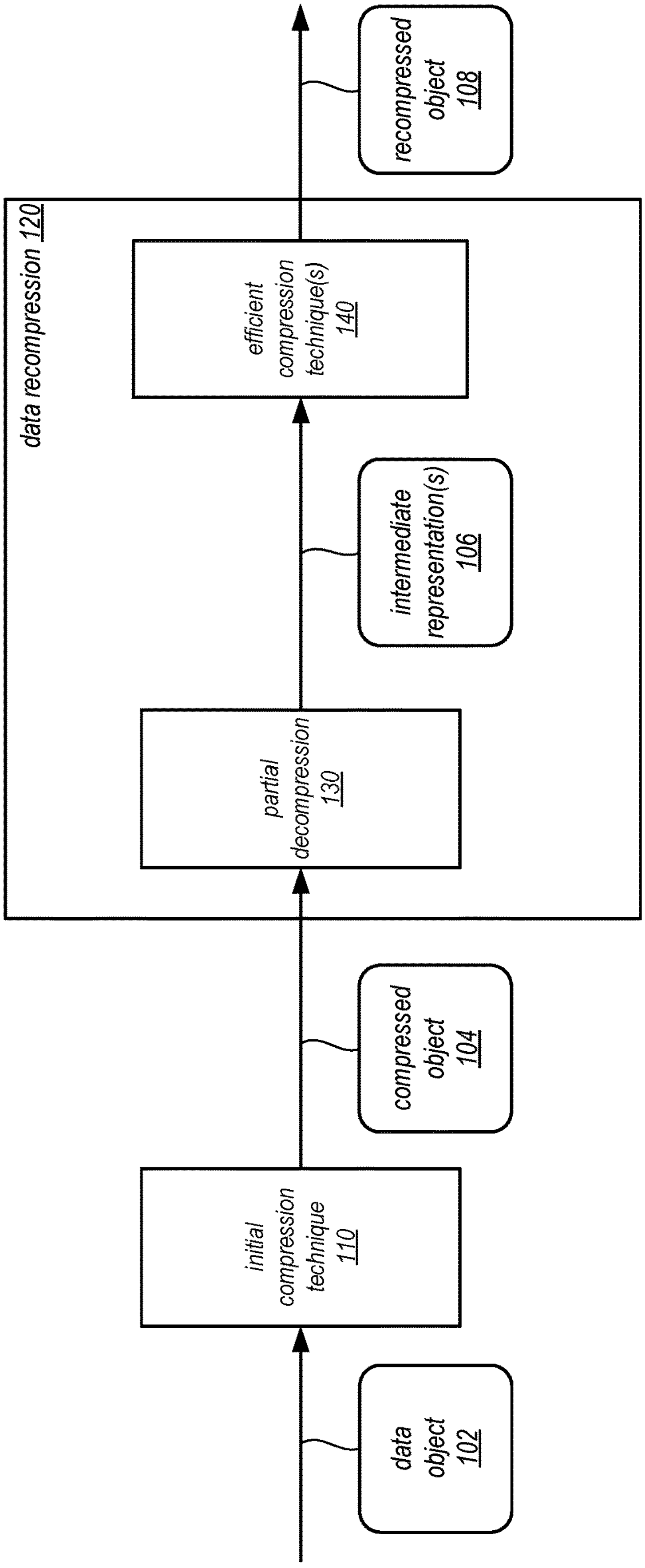
FIG. 1 illustrates a logical block diagram of efficient recompression of compressed data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for efficient recompression of compressed data are described herein. Some compression techniques are widespread and supported by many different systems, services, or applications in order to compress and decompress data objects. However, over time the performance of these compression techniques may not achieve the same compression results of later compression techniques. For example, a GZIP compression technique may not be able compress data files as small as other compression techniques, such as BSC, zstd, or later versions of Huffman compression. For these more widespread but less performant compression techniques, it may be desirable to recompress data objects using a more performant compression technique.

In order to do so in a non-disruptive way, that minimizes or eliminates changes to existing systems which already incorporate these less performant compression techniques, an efficient compression technique may be implemented in various embodiments that can accept compressed data objects and still perform recompression without requiring changes or input from, for example, a client or other application that submits data objects that are already compressed. For instance, different implementations of the same compression technique (e.g., GZIP) may have different configurations or settings that result in variations between compressions (e.g., different intermediate representations, as discussed below, may be generated for the same file using a differently configured initial stage of encoding). Therefore, recompression techniques that do not have to know the specific configuration of the initial stage of encoding in order to perform efficient recompression may be more adaptable to current compression implementations without requiring those implementations to be modified to, for example, provide the specific configuration of the initial stage of encoding.

Moreover, the efficient recompression techniques discussed below can be performed with minimized additional latency allowing for the implementation of recompression of compressed data in data storage system workflows or actions without substantially impact client-facing performance (e.g., requests to store or read recompressed data objects may not perform worse than minimum performance guarantees, such as Service Level Agreements (SLAs)). For example, as discussed below recompressing intermediate representations (as opposed to completely decompressing data objects) may result in large time savings for recompressing the data object. Accordingly, for at least the reasons discussed above, embodiments of efficient recompression of compressed data may improve the performance of different systems, services, or applications that implement them.

FIG. 1 illustrates a logical block diagram of efficient recompression of compressed data, according to some embodiments. As indicated at 102, an initial compression technique 110 (e.g., GZIP) may compress a given data object, such as data object 102 (e.g., a data file, record, or structure) in two stages, an initial or first stage that parses or otherwise generates intermediate representations of portions of the data object (e.g., as discussed in detail below with regard to FIG. 4) and a second or final stage that encodes the intermediate representations to produce the final, compressed object 104. Data recompression 120 may be a feature, tool, system, application, or other component of various systems, services, or applications (e.g., as depicted below with regard to data recompression 232 in data storage service 210) that implements efficient recompression techniques to recompress compressed data objects, such as compressed object 104.

For example, partial decompression 130 may be performed to decode from the final, compressed version of the data object back to the intermediate representations (which would have been generated by the initial encoding (e.g., parsing). Then, these intermediate representations(s) 106 can be recompressed using different, more efficient compression technique(s) 140. For example, a single different recompression technique can be applied to all of the intermediate representation(s) 106 or different recompression techniques applied to different ones of the intermediate representations. In some embodiments, compression technique(s) 140 may be dynamically selected, as discussed below with regard to FIG. 3. Once the intermediate representations are compressed, the recompressed object 108 may be provided for storage or various other downstream tasks.

Various different types of systems and services can implement efficient recompression of compressed data, such as data storage service implemented as part of a provider network as discussed below with regard to FIG. 2 or other type of data storage or management system that implements or uses efficient recompression of compressed data. The previous description of data recompression in FIG. 1 is a logical illustration and thus is not to be construed as limiting as to the specific system for implementing efficient recompression of compressed data.

This specification begins with a general description of a provider network that implements a data storage service that implements efficient recompression of compressed data by the data storage service. Then various examples of the data storage service including different components/modules, or arrangements of components/module that may be employed as part of implementing the data storage service are discussed. A number of different methods and techniques to implement efficient recompression of compressed data are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
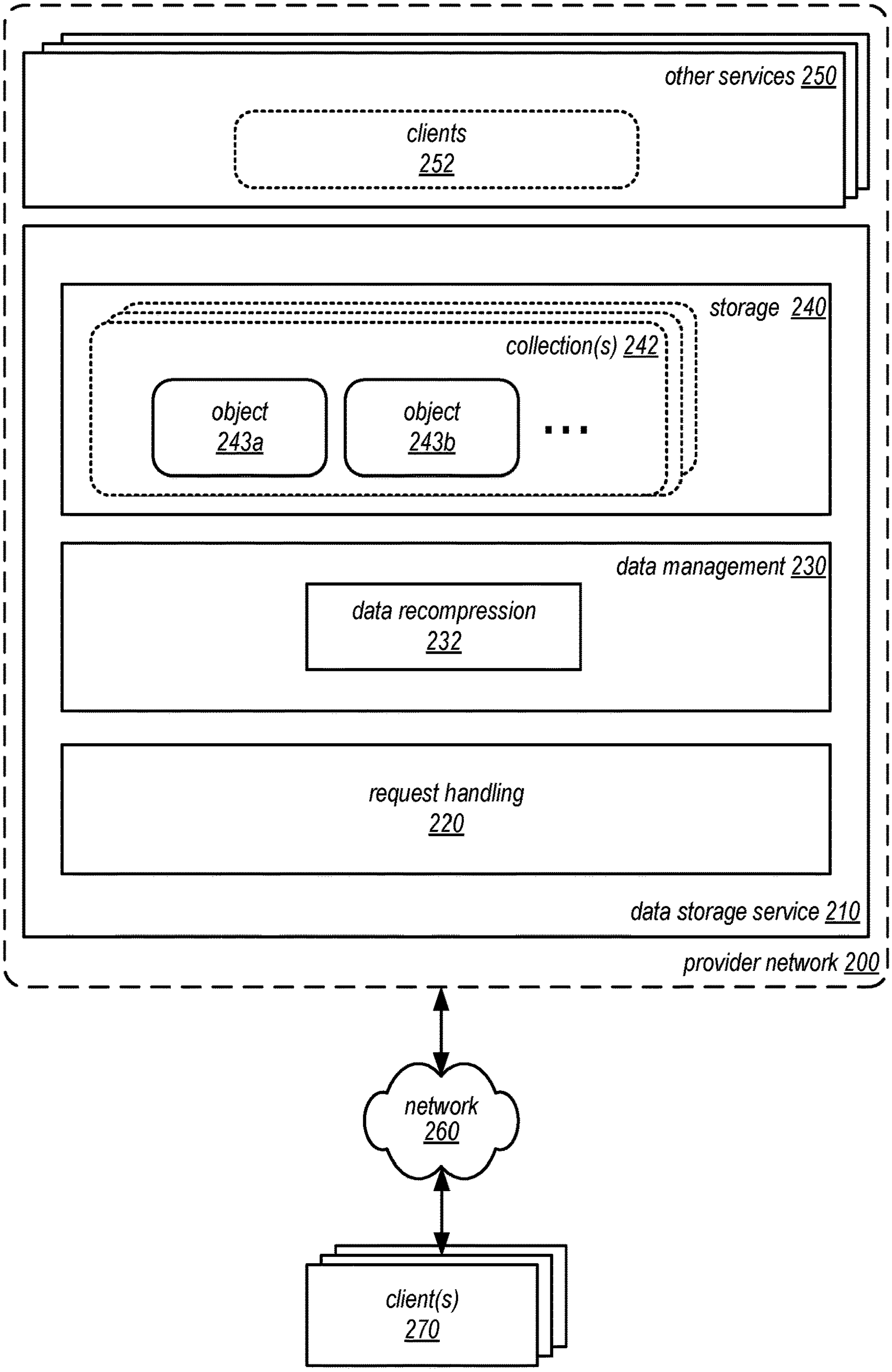
FIG. 2 is a logical block diagram illustrating a provider network implementing a file system service that implements efficient recompression of compressed data, according to some embodiments.

FIG. 2 is a logical block diagram illustrating a provider network implementing a file system service that implements efficient recompression of compressed data, according to some embodiments. In various embodiments, a provider network, such as provider network 200, may be a private or closed system or may be set up by an entity such as a company or a public sector organization to provide one or more services (such as various types of cloud-based storage, processing, or other computing resources) accessible via the Internet and/or other networks to clients 270. The provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to user commands. These resources can be dynamically provisioned and reconfigured to adjust to variable load, providing a fully-managed service and/or server-less experience for users.

In various embodiments, provider network 200 can be formed as a number of regions, where a region may be a separate geographical area in which the provider network clusters or manages data centers, in some embodiments.

Each region may include two or more availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. Clients 270 can connect to availability zones of the provider network 200 via a publicly accessible network (e.g., the Internet, a cellular communication network).

Regions may be connected to a global network which includes private networking infrastructure (e.g., fiber connections controlled by the cloud provider) connecting each region to at least one other region, in some embodiments. The provider network 200 may deliver content from points of presence outside of, but networked with, these regions by way of edge locations and regional edge cache servers, in some embodiments. This compartmentalization and geographic distribution of computing hardware enables the provider network to provide low-latency resource access to users on a global scale with a high degree of fault tolerance and stability.

In some embodiments, provider network 200 may implement various computing resources or services across one or more regions, such as data storage service services 210 (e.g., object storage services, block-based storage services, various types of database services (e.g., SQL, NoSQL, document, graph, time series, and so on), blob storage, or data warehouse storage services)), and other services 250, which may include a virtual compute service, data processing service(s) (e.g., map reduce, data flow, and/or other large scale data processing techniques), and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 9 and described below. In various embodiments, the functionality of a given system or service component (e.g., a component of identity and access management services 210 or other services 250) may be implemented by a particular node or may be distributed across several nodes. In some embodiments, a given node may implement the functionality of more than one service system component (e.g., more than one data store component).

Data storage service 210 may provide a data storage system for use with external clients 270 or internal clients 252 of provider network 200, in various embodiments. In various embodiments, data storage service 210 may implement multiple different tiers for hosting collection(s) 242 (e.g., groups, buckets, or other associated objects) that include one or more data objects 243*a* and 243*b*). For example, in at least some embodiments, data storage service 210 may implement request handling 220, which may be implemented across one or more nodes to handle various access requests on behalf of clients. Request handling 220 may implement request routing to route access requests to other tiers for handling, as discussed in detail below.

Request handling 220 may support various interfaces, including a web-based console, a set of application programming interfaces (such as REST APIs or other web-service APIs), command-line tools, and/or graphical user interfaces may be used by clients 270 or 252 to request various types of storage-related operations from the data storage service 210.

A client may, for example, submit a CreateCollection request, indicating that a new item collection or container is to be created. Such collections, like collection 242, may, for example, be used to group similar data items together. In response, the service 210 may store metadata representing a new container, and provide a collection identifier to the client.

In order to create new data object, in at least some embodiments a client may submit a Put request. The Put request may, for example, include a parameter (e.g., collectionID) identifying the particular bucket within which the new data object is to be created, a key or identifier of the data object, and a file (content file) comprising the raw data to be stored. In response to the Put request, the service 210 may store the specified data at one or more storage devices in accordance with applicable resilience and/or availability requirements in various embodiments. In addition, metadata pertaining to the data object being stored, such as the creation time, creator ID, and the like may be stored in various embodiments, and an indication that the Put succeeded may be provided to the client. As discussed below, the Put request may specify whether the object is compressed and/or whether recompression should be performed.

Figure 5:
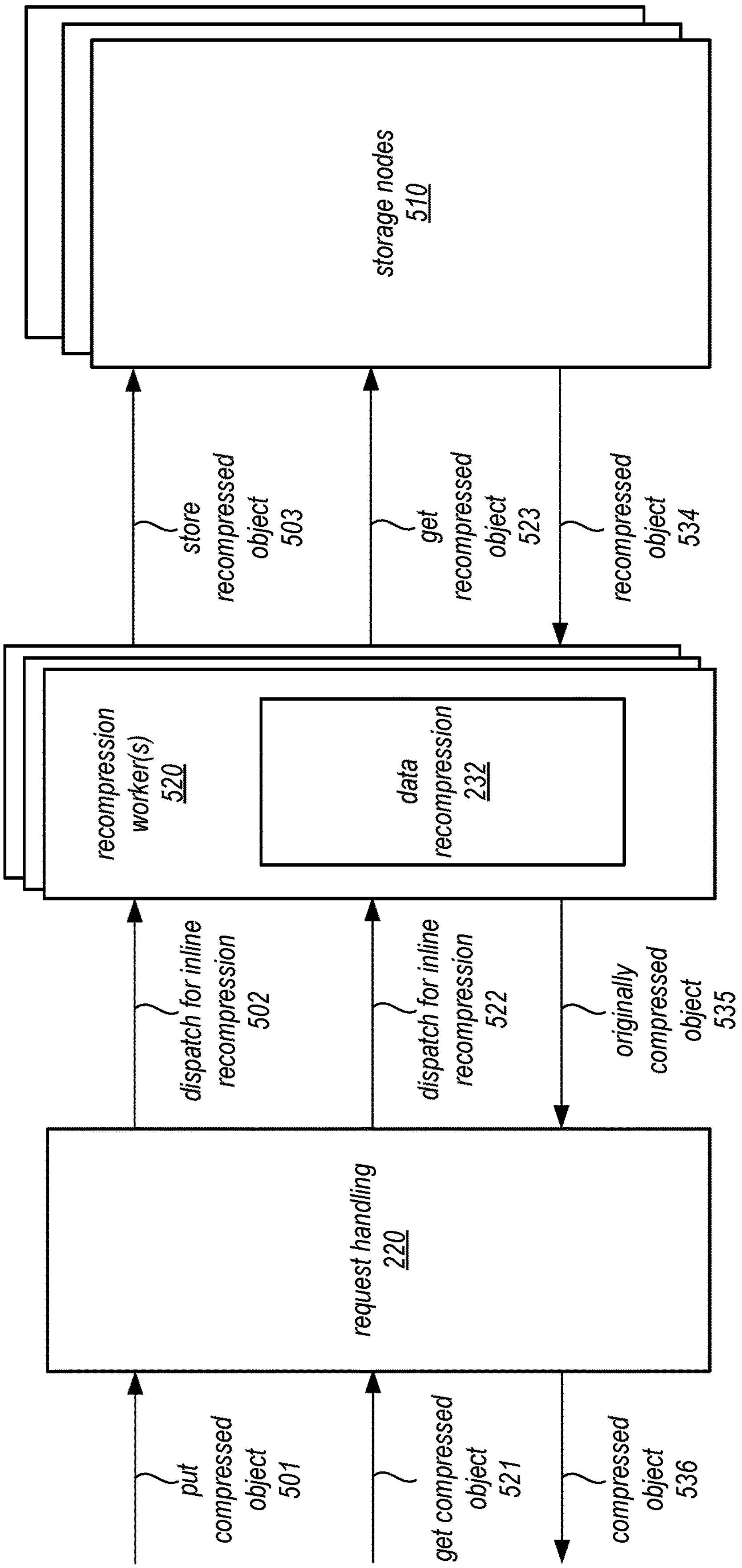
FIG. 5 is a logical block diagram illustrating interactions to implement efficient recompression of compressed data as part of storing a compressed data object in a data storage service, according to some embodiments.
Figure 6:
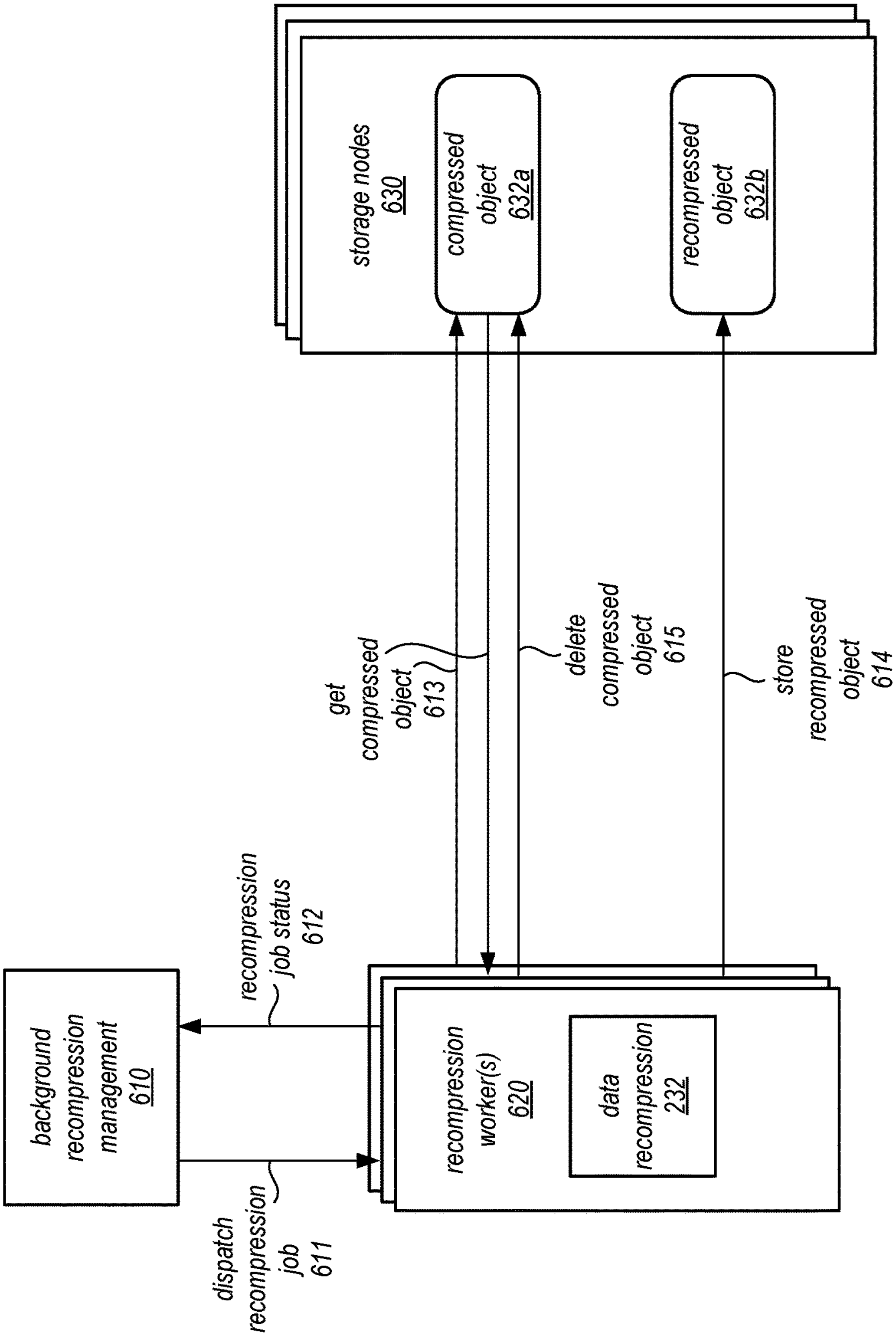
FIG. 6 is a logical block diagram illustrating interactions to implement efficient recompression of compressed data as part of a background operation of a data storage service, according to some embodiments.

Data management 230 may implement various control plane or other management features that may monitor the health and performance of requests at different components, such as handling of access requests at request handling 220, performance of various background or other management operations, including background recompression as discussed below with regard to FIG. 6 or inline regression as discussed below with regard to FIG. 5, deployment decisions (e.g., of objects/collections on storage nodes), and so on. For example, if a node or other component fails, a request fails, or other interruption occurs, control plane 212 may be able to restart a job to complete a request (e.g., instead of sending a failure response to the client).

In various embodiments, data storage service 210 may implement storage 240. Storage tier 240 may be implemented by a plurality of storage nodes that act as a persistent, block-based data store for hosted collections 242 and objects 243 therein. Storage 240 may provide multi-tenant storage, in various embodiments, and may distribute data for a same file object or collection 242 across multiple, physical storage nodes (e.g., according to various striping or sharding techniques). Storage 240 may be distributed across multiple availability zones and may store multiple copies of objects 243 and collection9s) 242 data in order to provide high data availability and reliability.

Clients 270 may encompass any type of client configurable to submit network-based requests to provider network 200 via network 260, including requests to data storage service 210 (e.g., a request to create a file, access a file (e.g., write or read to a file), or other file system operation). For example, a given client 270 may include a suitable version of a web browser, or may include a plug-in module or other type of code module configured to access a management console to configure a distributed file system 242 to be hosted in data storage service 210 or maybe a client application that utilizes a hosted distributed file system 242. In some embodiments, a client application may include sufficient protocol support (e.g., for a suitable version of file system protocols, such as Network File System (NFS) or other network-based file system protocols, interfaces, or communication techniques for generating and processing network-based services requests. In various embodiments, client 270 may be an application configured to interact directly with provider network 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network 200 (e.g., implemented on a resource of another service 250, such as virtual compute instance, like clients 252).

Clients 270 may convey network-based services requests to and receive responses from provider network 200 via network 260. In various embodiments, network 260 may encompass any suitable combination of networking hardware and protocols necessary to establish network-based-based communications between clients 270 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients may communicate with provider network 200 using a private network rather than the public Internet.

Figure 3:
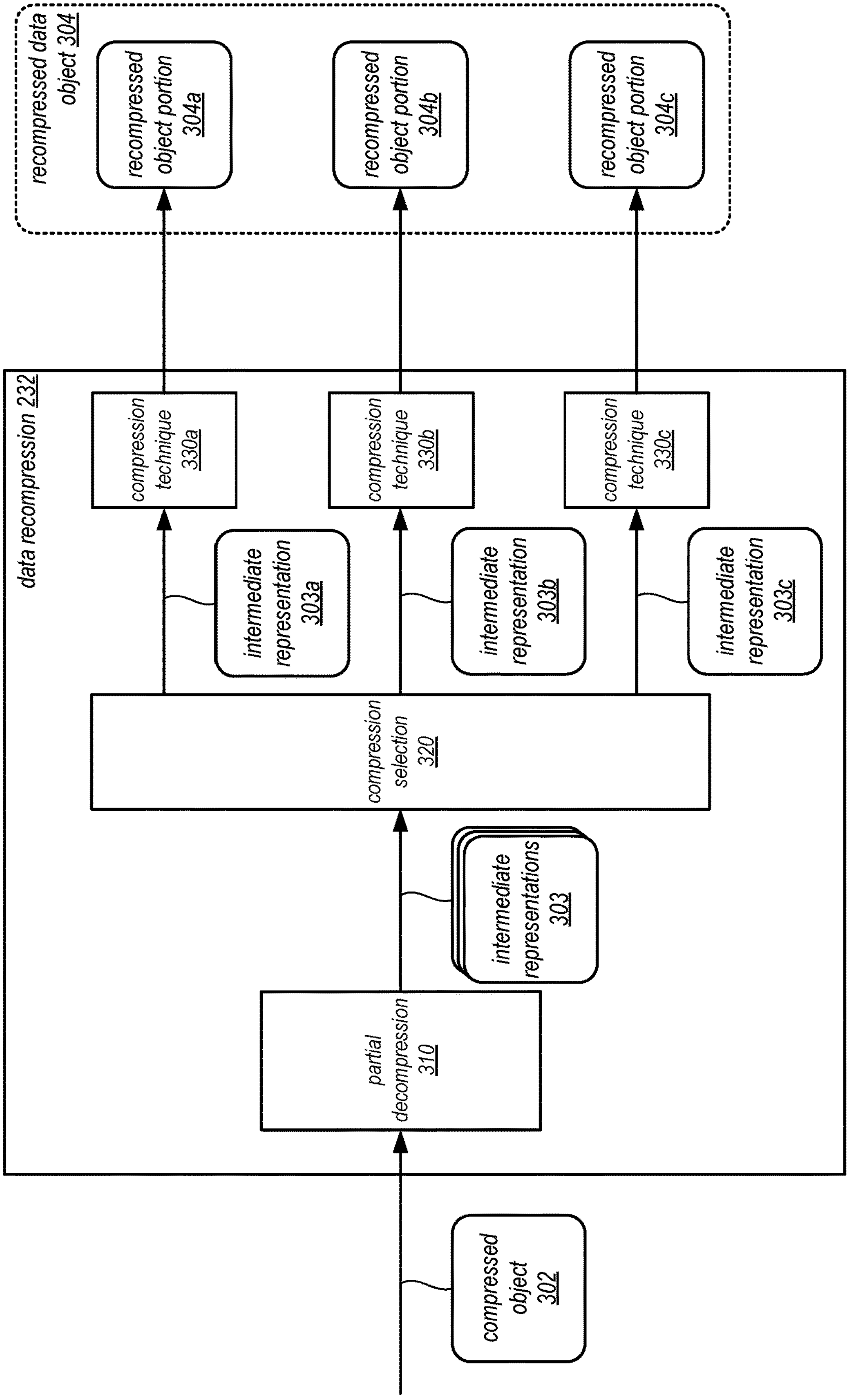
FIG. 3 is a logical block diagram illustrating efficient data recompression that selects different compression techniques for recompression, according to some embodiments.
Figure 4:
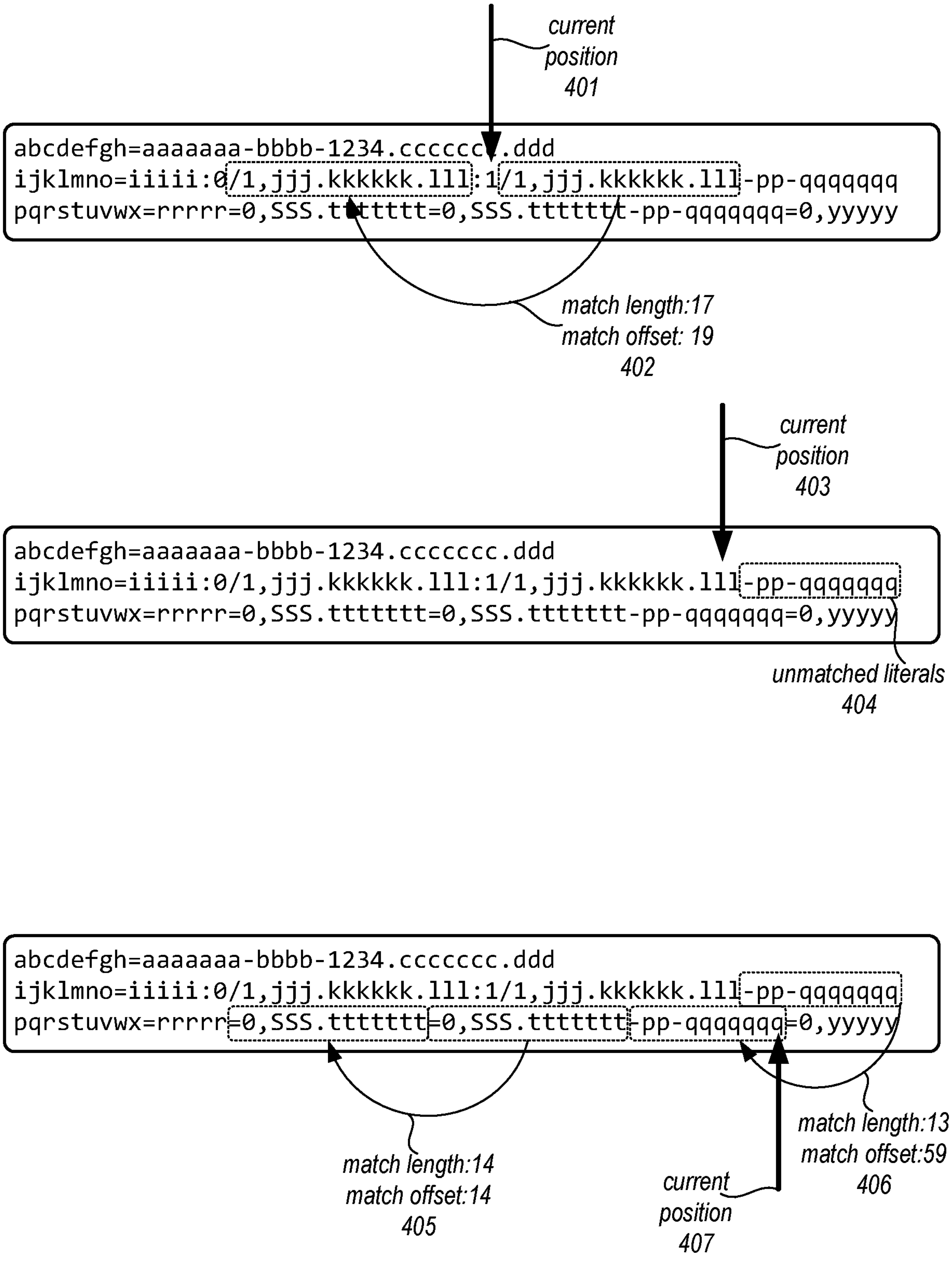
FIG. 4 is a logical block diagram illustrating parsing of a data object to generate different intermediate representations, according to some embodiments.

FIG. 3 is a logical block diagram illustrating efficient data recompression that selects different compression techniques for recompression, according to some embodiments. As indicated at 302, a compressed data object may be received. In some embodiments, metadata or various features descriptive of compressed object may also be received (e.g., which type compression technique was originally performed). Data recompression 232 may implement partial decompression 310. As discussed above with regard to FIG. 1, partial decompression may apply a corresponding decoding technique for a second stage of an original compression technique in order to generate intermediate representations 303. Different types of intermediate representations 303 may be generated for different first stages of original compression techniques. One such technique is LZ77 parsing. FIG. 4 is a logical block diagram illustrating parsing of a data object to generate different intermediate representations, according to some embodiments.

For example, for LZ77 parsing different intermediate data representations may include, literals (in bytes), match lengths (in bytes after offsetting by 3, the GZIP match lengths lie in the 0 . . . 255 range, for instance), match offsets (in 2 bytes), and an indication of whether the next symbol is a match or unmatched literal (in bits). The idea behind LZ77 parsing is to replace repeated occurrences of data with references to previous instances. This is explained in the figures below for a service log example. At a given point the parsing is at a position in the file. As it finds matches it would keep moving forward in the file. At the current position it tries to find a matching sequence already seen in the past. As indicated at current position 401, a match is found "/1.jjj.kkkkkk.lll" is found with a length and offset as indicated at 402. In this case, it found a match of length 17, at an offset of 19 before the current position. Thus the 17 characters can simply be described by storing the match length and offset. Next the pointer moves to the next position, as indicated at 403 and is unable to find a match for the next few characters which need to be stored as unmatched literals, as indicated at 404. Then, the current position advances again, as indicated at 407, and now the unmatched literals 404 have a found a match, as indicated at 406. Additionally, a further match has been found as indicated at 405. Using these techniques, a data object is parsed into unmatched literals, match lengths, and match offsets, as well as a stream to indicate whether a match is coming next or an unmatched literal.

The decoded intermediate representations 303 are passed to compression selection 320 which may select, determine, or otherwise identify appropriate compression techniques (e.g., 330*a* through 330*c*) for individual intermediate representation types, 303*a* through 303*c*. For example, compression selection 320 may have a mapping between intermediate representation type (e.g., matched or unmatched literal) and compression technique. In some embodiments, compression techniques may applied uniformly across all intermediate representations using a mapping between compression techniques a data object types (e.g., file types, such as text, log, pdf, image, etc.). In some embodiments, compression selection 320 may be implemented using a trained machine learning model, that generates an inference according to features of the data object and/or intermediate representations to predict which combination of one (or more) compression techniques to apply to intermediate representations.

Once selected, each intermediate representation may be compressed according to its selected compression technique. In some embodiments, intermediate representations may be further divided or modified prior to compression (e.g., split match offsets into higher and lower bytes and separately compress them or split match length into higher and lower bits and separately compress them). Then, recompressed data object 304 may be provided which may include the recompressed object portions 304*a* through 304*c* which may be compressed according to the same or different compression techniques. Metadata for recompressed data object, such as a manifest, may be updated to indicate the compression technique applied by data recompression 232 (e.g., indicated which compression techniques 330 are applied to which intermediate representations).

In some embodiments, efficient recompression of compressed data may be implemented in the request handling path, inline as part of storing a compressed data object. FIG.

5 is a logical block diagram illustrating interactions to implement efficient recompression of compressed data as part of storing a compressed data object in a data storage service, according to some embodiments. A request to put or otherwise store a compressed data object may be received, as indicated at 501. Request handling 220 may receive the request and evaluate the request to determine whether efficient data recompression should be applied to the data object. For example, a flag, parameter, or other indicator, may be identified in the request 501 by request handling 220, which indicates that the compressed data object is authorized or enabled for data recompression. In some embodiments, the storage location or destination (e.g., storage tier as discussed below with regard to FIG. 7) may be determinative of whether data recompression should be applied. In some embodiments, an account or other association of the data object may indicate that data recompression should be applied.

As indicated at 502, request handling 220 may dispatch the request to recompression worker(s) 520, which may implement data recompression 232 as discussed in detail above with regard to FIG. 3. Recompression worker(s) 520 may be one or more computing systems, servers, or nodes implemented as part of data storage service 210 in provider network 200 to perform efficient recompression of compressed data. Once the data object has been recompressed, recompression worker(s) 520 may complete the storage request to store the recompressed object at one or more storage nodes 510, as indicated at 503. Storage node(s) 510 may be one or more computing systems, servers, or nodes implemented as part of data storage 240 in data storage service 210 in provider network 200 that persistently store data objects. Multiple storage nodes may store multiple copies in order to increase resiliency and availability of data objects in data storage service (e.g., in the event of various failure scenarios).

In order to return data objects as they were provided, data storage service 210 may support techniques to decompress and recompress data object according to the original compression technique. For example, request handling 220 may receive a request to get a compressed object 521. The request 521 may include an identifier for the compressed data object (which may include an indicator that the data object was authorized for data recompression). Request handling 220 may dispatch the request to one or more recompression worker(s) 520 in order to get the recompressed object 523 from storage nodes 510. Once the recompressed object 534 is received, data recompression 232 may perform the reverse technique discussed above (and below with regard to FIG. 8). For example, data recompression 232 may be used to decompress the recompressed data object to generate intermediate representations, which can then be compressed according to the original compression technique. Recompression worker(s) 520 may then provide the originally recompressed object 535, which request handling 220 may return as the compressed object 536.

In some embodiments, efficient recompression of compressed data may be implemented out of the request handling path, offline as part of a background or separate data management operation. FIG. 6 is a logical block diagram illustrating interactions to implement efficient recompression of compressed data as part of a background operation of a data storage service, according to some embodiments. Background recompression management 610 may be implemented as part of data management 230, in some embodiments, in order to identify and direct recompression of compressed data objects that have already been stored at data storage service 210. For example, background recompression management 610 may access manifests or other metadata maintained for collections of data objects to identify those data objects that have not been efficiently recompressed. In some embodiments, efficient recompression may be authorized or enabled (e.g., via request) for a collection of data objects (or individual data objects). Accordingly, in some embodiments, some compressed data objects may not be considered for efficient recompression without enablement or other prior authorization. In some embodiments, background recompression management 610 may determine when to perform recompression (e.g., during off-peak times for data storage service 210 in order to prevent the additional workload of accessing data objects from impacting client requests to access data objects in storage service 210.

Once a compressed data object, such as compressed data object 632*a*, has been identified for recompression, background recompression management 610 may dispatch a compression job to one (or more) recompression worker(s) 620. Recompression worker(s) 620 may be one or more computing systems, servers, or nodes implemented as part of data storage service 210 in provider network 200 to perform efficient recompression of compressed data. As indicated at 620, recompression worker(s) 620 may implement data recompression 232.

When a dispatched job is received, recompression worker(s) 620 may send a request and receive the compressed object 632*a* from one or more storage nodes 630 storing the compressed data object to get 613 the compressed object for recompression. Like storage nodes 510 discussed above, storage node(s) 630 may be one or more computing systems, servers, or nodes implemented as part of data storage 240 in data storage service 210 in provider network 200 that persistently store data objects. Multiple storage nodes may store multiple copies in order to increase resiliency and availability of data objects in data storage service (e.g., in the event of various failure scenarios).

The compressed data object 632*a* may then be recompressed according to the techniques discussed above with regard to FIG. 3, and then stored, as indicated at 614, as recompressed data object 632*b*. Once recompressed, compressed object 632*a* may be deleted, as indicated at 615. During performance of the recompression job, recompression workers may send status updates for the recompression job to background recompression management 610, as indicated at 612. When completed, the status 612 may allow background recompression management 610 update the manifest or other metadata indicating the recompression status of individual data objects. If a failure is indicated (or detected by a failure to report a status after a period of time), background recompression management 610 may initiate a failure handling workflow, which may include retrying recompression for the compressed data object.

Figure 7:
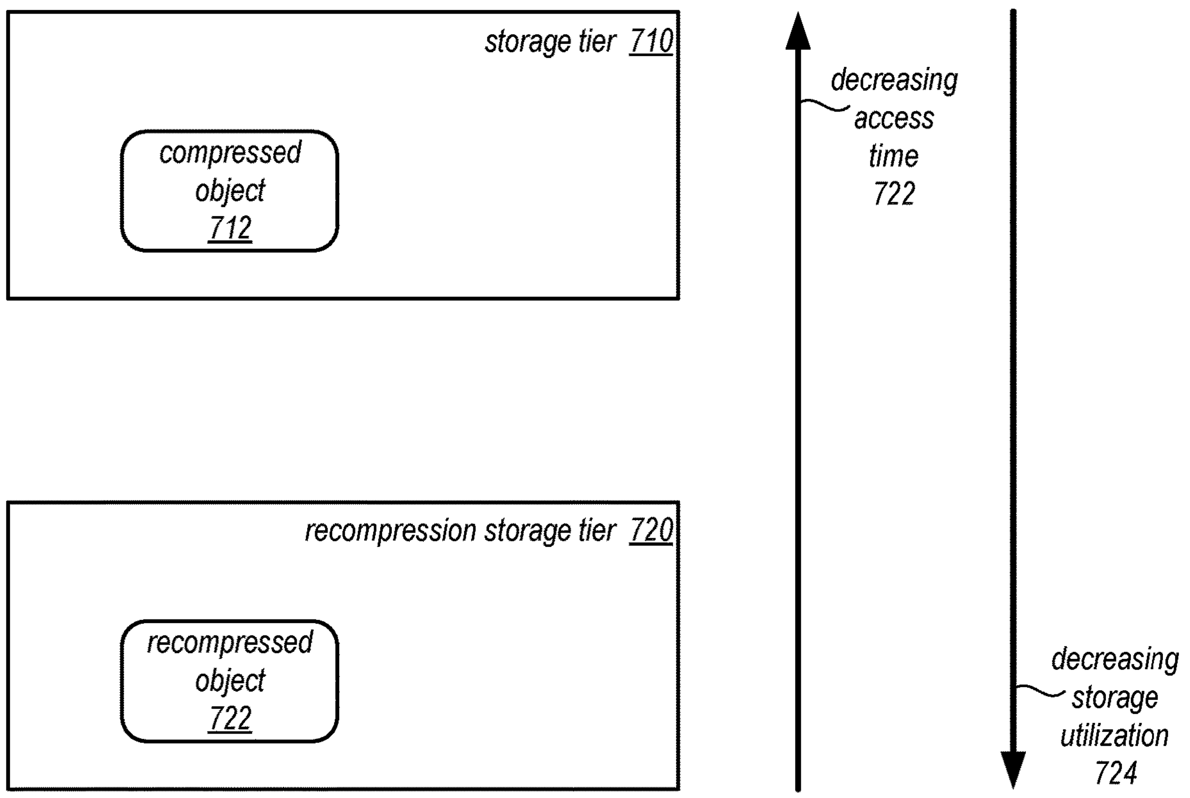
FIG. 7 is a logical block diagram illustrating different storage tiers, including a storage tier that implements efficient recompression of compressed data, according to some embodiments.

Data storage service 210 may be implemented in different ways to provide different storage characteristics for different use cases. For example, in some embodiments, data storage service may implement different storage tiers that have different performance characteristics for access stored data. One (or more) of these storage tiers may make use of efficient recompression of compressed data objects. FIG. 7 is a logical block diagram illustrating different storage tiers, including a storage tier that implements efficient recompression of compressed data, according to some embodiments.

Consider storage tiers 710 and 720. Each storage tier may be accessible to or offered to clients of storage service 210 to be available for different uses cases. Storage tier 710 with faster access times (as indicated by decreasing access time 722) may be better suited to use cases where client applications have latency or other access time requirements to meet. In these situations, it may be an acceptable cost for those client applications to store compressed object 712 without efficient recompression, even though compressed object 712 may utilize more storage (e.g., be larger in size) than recompressed object 722 (which may be the same data object as 712), as indicated by decreasing storage utilization 724.

Storage tier 720 may implement efficient recompression using, for instance, the inline or background recompression techniques discussed above with regard to FIGS. 5 and 6. Various use cases may find the decreased storage utilization (e.g., smaller object sizes) acceptable and have, for instance, more flexible access time requirements. For example, recompression storage tier 720 may be an archive storage tier which benefits from utilizing as little storage capacity as is required to reduce storage costs. Integrating efficient recompression of compressed data within in different storage tiers may increase the capabilities of different storage systems to provide better or more differentiated performance characteristics.

Although FIGS. 2-7 have been described and illustrated in the context of a data storage service, the various techniques and components illustrated and described in FIGS. 2-4 may be easily applied to other data storage or data management systems, including various backup storage systems, data file management systems, data archive systems, or any other system that may benefit from efficiently recompressing data that has already been compressed. As such, FIGS. 2-7 are not intended to be limiting as to other embodiments of a system that may implement efficient recompression of compressed data.

Various different systems and devices may implement the various methods and techniques described below, either singly or working together. For example, a data storage service such as described above with regard to FIGS. 2-7 may be configured to implement the various methods. Therefore, the above examples and or any other systems or devices referenced as performing the illustrated method, are not intended to be limiting as to other different components, modules, systems, or configurations of systems and devices.

Figure 8:
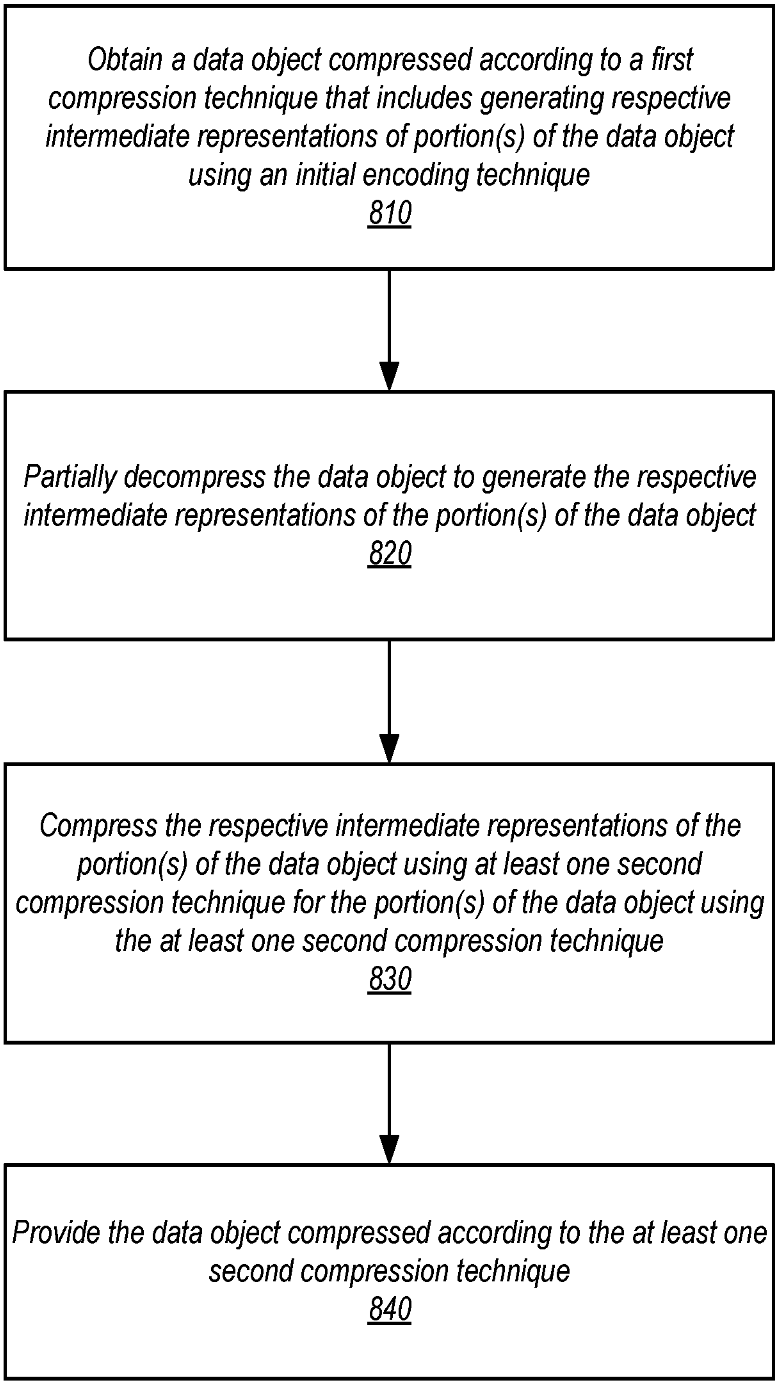
FIG. 8 is a high-level flowchart illustrating various methods and techniques to implement efficient recompression of compressed data, according to some embodiments.

FIG. 8 is a high-level flowchart illustrating various methods and techniques to implement efficient recompression of compressed data, according to some embodiments. As indicated at 810, a data object may be obtained, in various embodiments. The data object may be obtained in various ways. For example, the data object may be obtained as part of a request to put, store, upload, or otherwise add the data object to a data storage system. In some embodiments, the data object may be obtained as part of a background process, such as discussed above with regard to FIG. 6. In some embodiments, the data object may be associated with (e.g., via a parameter, account or user identifier) a particular storage tier, system, or location that implements efficient recompression (where other storage tiers, systems, or locations in the data storage system do not implement efficient recompression).

A compressed data object may include various types of data files, records, or other data structures, which may be encoded to reduce the size of the original data object using a compression technique (e.g., GZIP) so that the compressed data object is smaller than the original data object. Some compression techniques, as discussed above with regard to FIG. 1, may include multiple stages, including a first stage such as parsing or other encoding stage that generates one or more intermediate representations of a data object before performing a second stage that compresses those intermediate data representations.

To perform efficient recompression, the data object may be decompressed to generate the respective intermediate representations of portion(s) of the data object, as indicated at 820, in various embodiments. For example, the second stage compression (which may be a form of an encoding technique, such as Huffman coding, which replaces larger portions data (e.g., bits) with smaller portions represented by various symbols or references), may be reversed using a decoding technique that corresponds to the encoding technique of the second stage (e.g., using a Huffman decoding technique).

As indicated at 830, the respective intermediate representations of the portion(s) of the data object may be compressed using at least one second compression technique for the portion(s) of the data object using the at least one second compression technique, in some embodiments. As discussed above with regard to FIG. 3, compression techniques may be dynamically selected according to the data object's contents, type, or various other features or attributes of the data object (or the use to which the data object is maintained, such as whether lossless or lossy compression techniques are allowed). In at least some embodiments, the second compression technique(s) may be lossless so that the data object can be returned with the same data that it contained when it was first obtained (e.g., as illustrated and discussed above with regard to FIG. 5). In some embodiments, the same compression technique may be applied to all of the intermediate representations. In some embodiments, the second recompression technique may be specified as part of a request to perform recompression or a setting for efficient recompression. In some embodiments, different second recompression techniques may be tried until a best performing compression technique (e.g., for size or speed) is identified.

As indicated at 840, the data object compressed according to the at least one second compression technique may be provided, in some embodiments. For example, the recompressed data object may be sent back in response to a request, stored in a data store or other location, or passed to a downstream task, application, system, or process for further processing.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
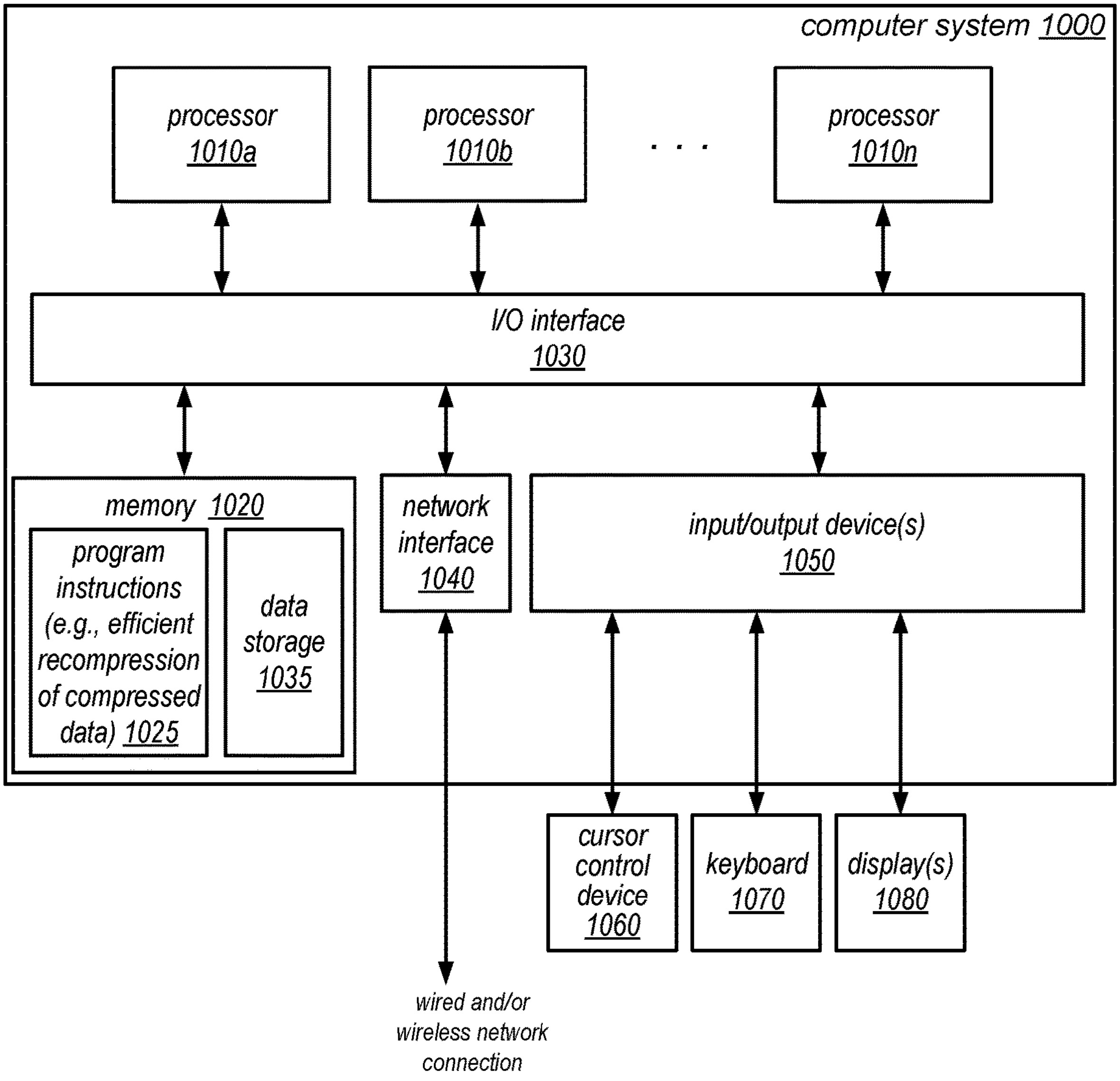
FIG. 9 illustrates an example system configured to implement the various methods, techniques, and systems described herein, according to some embodiments.

Embodiments of efficient recompression of compressed data as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., efficient recompression of compressed data) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, including various techniques to implement dynamically journaling types for files in a distributed file system and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a data storage system, the data storage system configured to:

receive a request to store a data object compressed according to a first compression technique, wherein the first compression technique comprises generating an intermediate representation of a portion of the data object using an initial encoding technique, wherein the intermediate representation comprises a plurality of different representation types;

partially decompress the data object to regenerate the plurality of different representation types of the respective intermediate representations of the one or more portions of the data object;

select at least one second compression technique for the intermediate representation of the portion of the data object;

respectively compress the plurality of different representation types of the intermediate representation of the portion of the data object, wherein at least one of the plurality of different representation types is compressed using the at least one second compression technique; and store the compressed plurality of different representation types of the intermediate representation of the portion of the data object as part of a recompressed data object.

2. The system of claim 1, wherein the partial decompression and the compression of the intermediate representation of the portion of the data object are performed as part of a request to put the data object in the data storage system.

3. The system of claim 1, wherein the partial decompression and the compression of the respective intermediate representations of the portion of the data object are performed as part of a background recompression operation in a data storage system.

4. The system of claim 1, wherein the data storage system is a data storage service implemented as part of a provider network and wherein the data object is one of a plurality of data objects stored in a collection created on behalf of a client of the data storage service via an interface of the data storage service.

5. A method, comprising:

performing, by one or more computing devices:

obtaining a data object compressed according to a first compression technique, wherein the first compression technique comprises generating an intermediate representation of a portion of the data object using an initial encoding technique, wherein the intermediate representation comprises a plurality of different representation types;

partially decompressing the data object to regenerate the plurality of different representation types of the intermediate representation of the portion of the data object;

respectively compressing the plurality of different representation types of the intermediate representation of the portion of the data object, wherein at least one of the plurality of different representation types is compressed using at least one second compression technique; and providing the compressed plurality of different representation types of the intermediate representation of the portion of the data object as part of a recompressed data object.

6. The method of claim 5, wherein the partially decompressing and the compressing of the intermediate representation of the portion of the data object are performed in response to a request to store the data object in a data storage system.

7. The method of claim 5, wherein the partially decompressing and the compressing of the intermediate representation of the portion of the data object are performed as part of a background recompression operation in a data storage system.

8. The method of claim 5, wherein compressing the respective intermediate representation of the portion of the data object uses a third compression technique different than the at least one second compression technique for a different one of the plurality of different intermediate representation types.

9. The method of claim 5, wherein the plurality of intermediate representation types comprise literals, match lengths, and offsets.

10. The method of claim 5, wherein a request is received that indicates recompression of the data object.

11. The method of claim 5, further comprising selecting the at least one second compression technique using a machine learning model trained to select compression techniques for intermediate representations of data objects.

12. The method of claim 5, further comprising:

receiving a request to obtain the data object compressed according to the first compression technique;

obtaining the recompressed data object;

partially decompressing the recompressed data object according to the at least one second compression technique to regenerate the intermediate representation of the portion of the data object;

compressing the data object according to the first compression technique based on the intermediate representation of the portion of the data object; and responding to the request with the data object compressed according to the first compression technique.

13. The method of claim 5, wherein providing the compressed plurality of different representation types of the intermediate representation of the portion of the data object as part of the recompressed data object, stores the recompressed data object in a storage tier of a data storage system that offers recompression of compressed data as an attribute of storing data objects in the storage tier.

14. One or more non-transitory, computer-readable storage media, storing program instructions that when executed on or across one or more computing devices cause the computing devices to implement:

receiving a data object compressed according to a first compression technique, wherein the first compression technique comprises generating an intermediate representation of a portion of the data object using an initial encoding technique, wherein the intermediate representation comprises a plurality of different representation types;

partially decompressing the data object to regenerate the plurality of different representation types of the respective intermediate representations of the one or more portions of the data object;

identifying at least one second compression technique for the intermediate representation of the portion of the data object;

respectively compressing the plurality of different representation types of the intermediate representation of the portion of the data object, wherein at least one of the plurality of different representation types is compressed using the at least one second compression technique; and providing the compressed plurality of different representation types of the intermediate representation of the portion of the data object as part of a recompressed data object.

15. The one or more non-transitory, computer-readable storage media of claim 14, wherein the partially decompressing and the compressing of the intermediate representation of the portion of the data object are performed in response to a request to store the data object in a data storage system.

16. The one or more non-transitory, computer-readable storage media of claim 14, wherein the partially decompressing and the compressing of the intermediate representation of the portion of the data object are performed as part of a background recompression operation in a data storage system.

17. The one or more non-transitory, computer-readable storage media of claim 14, wherein a request is received that indicates recompression of the data object.

18. The one or more non-transitory, computer-readable storage media of claim 14, wherein identifying the second at least one compression technique uses one or more mappings between intermediate representation types to identify the second at least one compression technique.

19. The one or more non-transitory, computer-readable storage media of claim 14, wherein providing the compressed plurality of different representation types of the intermediate representation of the portion of the data object as part of a recompressed data object stores the recompressed data object in a storage tier of a data storage system that offers recompression of compressed data as an attribute of storing data objects in the storage tier.

20. The one or more non-transitory, computer-readable storage media of claim 14, wherein the one or more computing devices implement a data storage service offered as part of a provider network and wherein the data object is one of a plurality of data objects stored in a collection created on behalf of a client of the data storage service via an interface of the data storage service.

* * * * *